United States Patent [19]
Jorgensen et al.

[11] 3,852,515
[45] Dec. 3, 1974

[54] WEATHERPROOF BUS DUCT HOUSING

[75] Inventors: George N. Jorgensen; Frank J. Wartner, both of Oxford, Ohio

[73] Assignee: Square D Company, Park Ridge, Ill.

[22] Filed: Sept. 21, 1973

[21] Appl. No.: 399,585

Related U.S. Application Data

[63] Continuation of Ser. No. 77,821, Oct. 5, 1970, abandoned.

[52] U.S. Cl.............. 174/68 C, 174/88 B, 174/99 B
[51] Int. Cl............................................... H02g 5/06
[58] Field of Search..... 174/68 B, 88 B, 99 B, 72 B, 174/71 B, 68 C; 339/22 B

[56] References Cited
UNITED STATES PATENTS

| | | | |
|---|---|---|---|
| 3,365,537 | 1/1968 | Fehr, Jr. et al.................... | 174/88 B |
| 3,571,488 | 3/1971 | Douglass........................... | 174/88 B |

Primary Examiner—Darrell L. Clay
Attorney, Agent, or Firm—H. J. Rathbun; P. J. Rose

[57] ABSTRACT

The housing includes two outwardly flanged channel members, four auxiliary housing members of generally Z-shaped cross section, and four end plate members. Each flange of the two flanges of one channel member is secured to one of the two flanges of the other channel member by a row of screws which also secures one pair of the Z-shaped auxiliary housing members in place, reversely positioned with respect to each other and with free end portions pointing toward the other pair of Z-shaped auxiliary housing members secured to the other flanges of the channel members. The flanges of the channel members and corresponding portions of the Z-shaped auxiliary housing members are cut away at opposite ends of the housing to present flat surfaces to the end plate members, which are secured in place for additional strength at the joints when sections of the bus duct are secured together by tie channels. Gaskets are provided between the flanges of the channel members and under the end plate members where the flanges are cut away.

4 Claims, 4 Drawing Figures

PATENTED DEC 3 1974 3,852,515
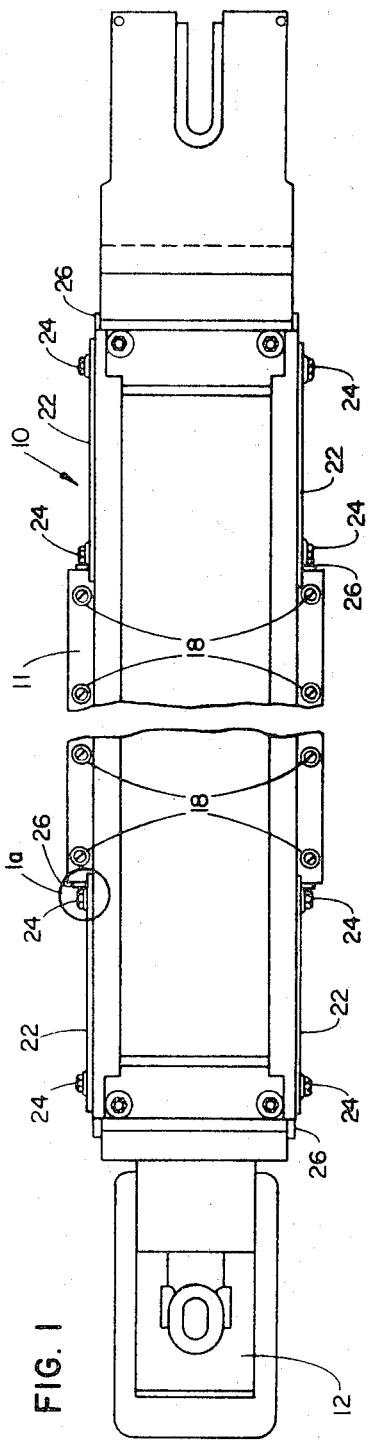
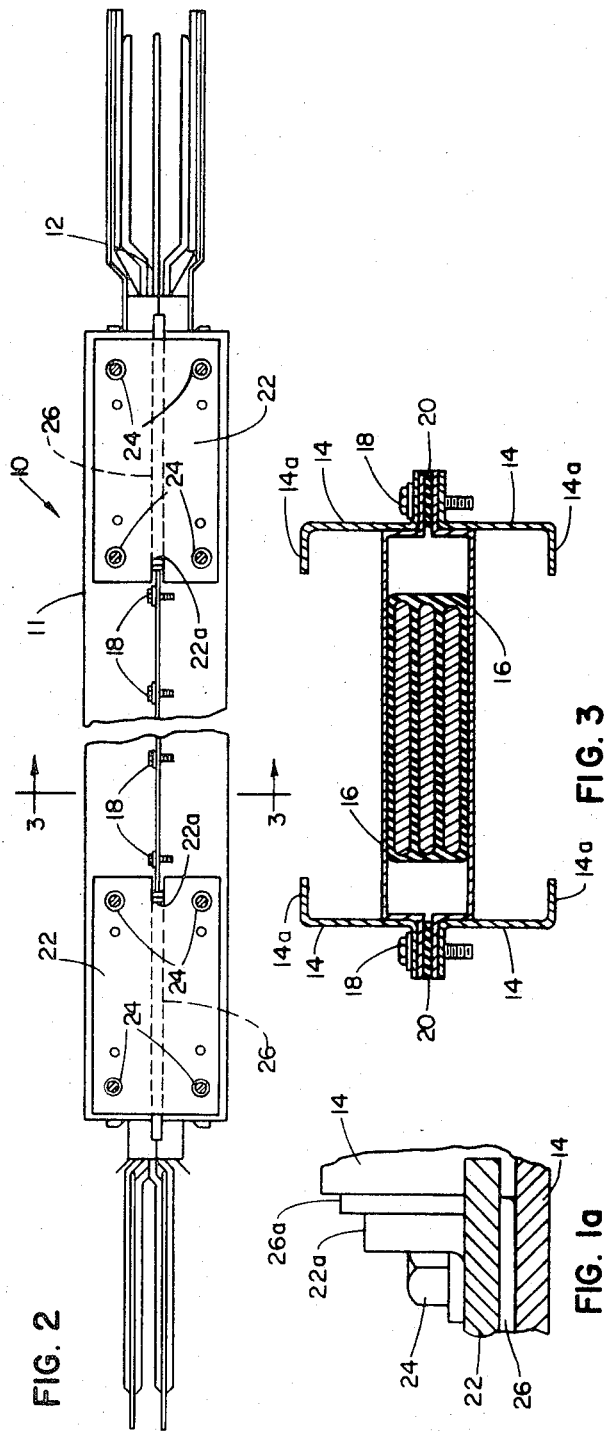
INVENTOR.
GEORGE N. JORGENSEN
FRANK J. WARTNER

WEATHERPROOF BUS DUCT HOUSING

This is a continuation of application Ser. No. 77,821, filed Oct. 5, 1970, now abandoned.

This invention relates generally to a weatherproof bus duct housing, and more particularly to a bus duct housing formed of two substantially identical outwardly flanged channel members, four identical generally Z-shaped auxiliary housing members, and four identical end plate members.

An object of the invention is to provide a weatherproof bus duct housing of simple construction and economical cost.

Another object is to provide a weatherproof bus duct housing including four auxiliary housing members enabling the bus duct to be hung horizontally with any of four sides up.

A further object is to provide a weatherproof bus duct housing having increased mechanical strength at joints between connected sections of bus duct.

Other objects and advantages will become apparent when the following specification is considered along with the accompanying drawings, in which:

FIG. 1 is a longitudinal flatwise view of a section of weatherproof feeder bus duct having a housing constructed in accordance with the invention;

FIG. 1a is an enlarged view, partially in section, of circled portion 1a of FIG. 1;

FIG. 2 is a longitudinal edgewise view of the bus duct section of FIG. 1;

FIG. 3 is an enlarged sectional view taken along the line 3—3 of FIG. 2;

A section 10 of weatherproof feeder bus duct is shown in FIGS. 1 and 2, a central portion being broken away. Basically, the bus duct section 10 includes an elongated housing 11 and an assembly 12 of bus bars contained therein. The bus bar assembly 12 may be similar to that disclosed in U.S. Pat. No. 3,187,086, issued June 1, 1965, but with opposite ends of the bus bars constructed as in U.S. Pat. No. 3,189,680, issued Jube 15, 1965.

As can be seen in FIG. 3, the housing 11 includes six structural members, namely four generally Z-shaped auxiliary housing members 14 and two outwardly flanged channel members 16, all secured together as shown by a plurality of screws 18. The channel members 16 are reversely positioned with respect to each other, each flange of one channel member being secured to a flange of the other channel member. At each pair of secured-together flanges of the channel members 16, a pair of the auxiliary housing members 14 are reversely positioned with respect to each other and secured to the pair of flanges with free end portions 14a thereof pointing toward the other pair of auxiliary housing members 14 secured to the other pair of secured-together flanges of the channel members 16. Two gaskets 20 are provided, each being disposed between a pair of flange portions of the channel members 16.

As shown in FIGS. 1 and 2, adjacent each end of the housing 11 and respectively on opposite sides thereof, two plate members 22 are secured by a plurality of screws 24 for additional mechanical strength at the joint of two joined bus duct sections 10. The outer flanges of the channel members 16 and corresponding portions of the Z-shaped members 14 are cut away adjacent opposite ends of the housing 11 to form flat surfaces for engagement respectively by the plate members 22. On the inner side of each plate member 22 is an elongated gasket 26 sealing the space between the respective pair of Z-shaped members 14, which are L-shaped in cross section under the plate members 22 where projecting portions have been cut away. As best shown in FIGS. 1a and 2, each plate member 22 has a bent tang 22a which holds an end portion 26a of the respective gasket 26 against cut-away end portions of the respective pair of Z-shaped members 14, the respective pair of cut-away flanges of the channel members 16, and an end portion of the respective gasket 20.

The two channel members 16 are substantially identical, the four auxiliary housing members 14 are identical, and the four end plates 22 are identical, resulting in a simple, economic construction.

When the duct is to be hung with the long cross sectional dimension of the bus bars extending vertically, hangers similar to that disclosed in U.S. Pat. No. 3,190,604, issued June 22, 1965, may be used to hook under the upper two auxiliary housing members 14. When the duct is to be hung with the long cross sectional dimension of the bus bars extending horizontally, as viewed in FIG. 3, hangers similar to that disclosed in U.S. Pat. No. 3,345,022, issued Oct. 3, 1967, may be used to hook under the upper horizontal portions of the upper two auxiliary housing members 14, or hangers similar to that disclosed in the U.S. Pat. No. 3,190,604, but with a wider crosspiece and longer side arms, may be used to hook under the lower horizontal portions of the lower two auxiliary housing members 14.

We claim:

1. A bus duct housing comprising a pair of elongated outwardly flanged channel members in reversely positioned relationship to each other, each flange of one channel member being secured to a flange of the other channel member, means at each pair of secured-together flanges providing a pair of elongated generally Z-shaped auxiliary housing members reversely positioned with respect to each other and secured to the pair of secured-together flanges with free end positions pointing toward the other pair of generally Z-shaped auxiliary housing members secured to the other pair of secured-together flanges, the flanges of the channel members and corresponding portions of the generally Z-shaped auxiliary housing members being cut away at opposite ends of the housing and on opposite sides thereof to provide four flat surface areas, and four end plate members secured respectively to the flat surface areas.

2. A bus duct housing as claimed in claim 1 including four gaskets disposed respectively on the inner sides of the end plate members at the juncture of the channel members.

3. A bus duct housing as claimed in claim 2 including a pair of additional gaskets, each of the additional gaskets being disposed between a pair of secured-together flanges.

4. A bus duct housing comprising a pair of like channel members, each channel member having a generally flat bottom portion and a pair of spaced generally parallel side portions, each side portion of each channel member having an outwardly extending flange portion generally parallel to the bottom portion, the channel members being disposed adjacent each other in reversely positioned relationship with their bottom portions spaced apart from each other and the side portions of each channel member extending from its bottom portion toward the other channel member, and each flange portion of one channel member being secured to a flange portion of the other channel member in generally parallel relationship therewith, and means at each pair of secured-together flange portions providing a pair of elongated generally Z-shaped auxiliary housing members, the two auxiliary housing members of each pair being disposed respectively on opposite sides of the respective pair of secured-together flange portions, each auxiliary housing member having a main body portion and a pair of leg portions extending generally perpendicularly from the main body portion respectively at opposite ends thereof and in opposite directions therefrom, one leg portion of each auxiliary housing member being secured to a respective one of the flange portions in generally parallel and substantially abutting relationship therewith, the main body portion of each auxiliary housing member being disposed in generally parallel and substantially abutting relationship with a respective side portion of a respective one of said channel members and extending from the one leg portion outwardly beyond the bottom portion of the respective channel member, the other leg portion of each auxiliary housing member being disposed in generally parallel and overlapping but spaced relationship with the bottom portion of the respective channel member, the flange portions of the channel members and corresponding portions of the generally Z-shaped auxiliary housing members being cut away at opposite ends of the housing on opposite sides to provide four flat surface areas, four end plate members secured respectively to the flat surface areas, four gaskets disposed respectively on the inner sides of the end plate members at the juncture of the channel members, and a pair of additional gaskets, each of the additional gaskets being disposed between a pair of the secured-together flange portions.

* * * * *